United States Patent [19]

Webster et al.

[11] Patent Number: 5,604,954
[45] Date of Patent: Feb. 25, 1997

[54] BLOWER-VACUUM DEVICE

[75] Inventors: Craig Webster, Jesmond; John Sadler, Darlington, both of United Kingdom

[73] Assignee: Black & Decker Inc., Newark, Del.

[21] Appl. No.: 594,005

[22] Filed: Jan. 30, 1996

[30] Foreign Application Priority Data

Jan. 30, 1995 [GB] United Kingdom .................. 9501751
Sep. 1, 1995 [GB] United Kingdom .................. 9517834

[51] Int. Cl.$^6$ ......................................................... A47L 9/28
[52] U.S. Cl. .................................. 15/330; 15/339; 15/344; 15/405; 15/412
[58] Field of Search .............................. 15/405, 344, 339, 15/412, 330

[56] References Cited

U.S. PATENT DOCUMENTS

| | | |
|---|---|---|
| 2,140,143 | 12/1938 | Sellers et al. . |
| 2,921,153 | 1/1960 | Descarries . |
| 4,001,912 | 1/1977 | Eriksson ............................ 15/339 |
| 4,336,626 | 6/1982 | Hone et al. ......................... 15/339 |
| 4,398,316 | 8/1983 | Scott et al. ...................... 15/339 X |
| 4,694,528 | 9/1987 | Comer et al. . |
| 4,809,398 | 3/1989 | Linduist et al. . |
| 4,905,343 | 3/1990 | Jailor ............................. 15/339 X |

FOREIGN PATENT DOCUMENTS

| | | | |
|---|---|---|---|
| 2655547 | 6/1978 | Germany ...................... 15/339 |
| 1163710 | 9/1969 | United Kingdom . |
| 2253094 | 8/1992 | United Kingdom . |

Primary Examiner—Chris K. Moore
Attorney, Agent, or Firm—Charles E. Yocum; Dennis A. Dearing; John D. Del Ponti

[57] ABSTRACT

A blower vacuum comprising a motor (10) operated by a switch (16) and located in a housing (4), a fan (14) drivable by a motor, at least one attachment member (6,106) which covers the fan and which is releasably attachable to the housing, and a safety interlock located at the interface between the housing and the attachment member comprising an actuating means (53) for activating the switch only when the attachment member is attached to the housing and a locking means (54, 42) for locking the attachment member to the housing when the motor is switched on.

12 Claims, 4 Drawing Sheets

BLOWER-VACUUM DEVICE

The present invention relates to a blower vacuum device, in particular for use in the collection of garden debris. The device is preferably of the kind which may be used either in a vacuum mode to suck debris into the device or in a blowing mode to discharge a stream of air so that debris can be blown into piles, ready for collection.

Known forms of device of this kind, for example, that disclosed in U.S. Pat. No. 4,694,528, have a motor which is located within a housing and which drives a fan. An air inlet is provided in front of the fan and an air outlet is provided radially of the fan. When the device is used as a blower, a grill is placed over the air inlet. A blower duct is placed over the outlet of the fan. When the device is switched on the fan rotates and draws air through the grill and expels it from the outlet from which the air is directed down the blower duct. Air is expelled from the end of the blower duct distant from the fan, which end is directed towards the ground by an operator of the device to blow debris from one place to another.

The device disclosed in U.S. Pat. No. 4,694,528 also has a vacuum mode. The grill and the blower duct are removed from the housing and replaced with a suction duct which is placed over the air inlet to the fan and a collecting bag which is placed over the air outlet from the fan. The suction duct effectively prevents an operator of the device from accessing the rotating fan. When the device is switched on, air and entrained debris is sucked into the end of the suction duct which is distant from the impeller. The air and debris is drawn through the fan and expelled radially from the fan and into the collecting bag.

The device disclosed in U.S. Pat. No. 4,694,528 has a safety feature whereby the motor can only be run when the fan is covered by either the grill (in blowing mode) or the suction duct (in vacuum mode). This safety feature is designed to prevent an operator of the device from having access to a fan which is rotating. Taking of the grill or the suction duct will deactivate the motor.

The aim of the present invention is to provide an improved safety interlock.

Accordingly, the present invention provides a blower vacuum device comprising:

a motor operated by a switch and located in a housing, a fan drivable by a motor, at least one attachment member which covers the fan and which is releasably attachable to the housing, and a safety interlock located at the interface between the housing and the attachment member comprising;
  actuating means for activating the switch only when the attachment member is attached to the housing,
  characterized in that the safety interlock additionally comprises;
    a locking means for locking the attachment member to the housing when the motor is switch on.

Therefore, the safety interlock according to the present invention does not allow the fan to be exposed while the motor is running. The motor has first to be switched off before the attachment member can be unlocked and removed from the housing.

Preferably, the attachment member is releasably attached to the housing by a catch means which is selectively engageable by a latch means and the locking means locks the latch means in a position in which it engages the catch means.

The locking means and the actuating means are preferably responsive to an actuating member on the housing which is operable by a user of the blower vacuum so that movement of the actuating member to a first position causes the actuating means to activate the motor switch and to lock the latch means and movement of the actuating member to a second position causes the actuating means to deactivate the motor switch and to unlock the latch means.

In a preferred embodiment the latch means comprises a hook which engages with a recess in the catch means. As the hook is weight and stress bearing, it is preferred that it is part of a small component such as the latch so that it can be made cheaply of a strong material. The catch means may be located on the attachment member and may additionally comprises at least one projection to which the actuating means is responsive to actuate the motor. A further advantage is that if any part of the releasable attachment between the attachment member and the housing breaks, it will be the part which bears the weight and stresses, i.e. the hook. The projections (which do not bear as much weight or stresses) should remain intact and attached to the attachment member and so when the attachment member falls away from the housing when the hook breaks the projections will also fall away and the actuating means will no longer actuate the motor.

The actuating means may comprise at least one pivot lever which activates the motor switch when an actuating member operated by the user of the blower vacuum and an extension of the attachment member both engage the actuating means.

The attachment member may be a blower involute when the blower vacuum is in blower mode and a vacuum involute when the blower vacuum is in suction mode. Alternatively, the attachment member may be a grill when the blower vacuum is in blower mode and a suction duct when the blower vacuum is in vacuum mode.

The present invention will now be described in more detail with reference to the accompanying drawings in which.

Throughout the following description like parts shown on the Figures are referred to by the same numeral.

The blower vacuum shown in the Figures has a removable involute as described in our co-pending patent application number 9501751.5.

Figure 1:
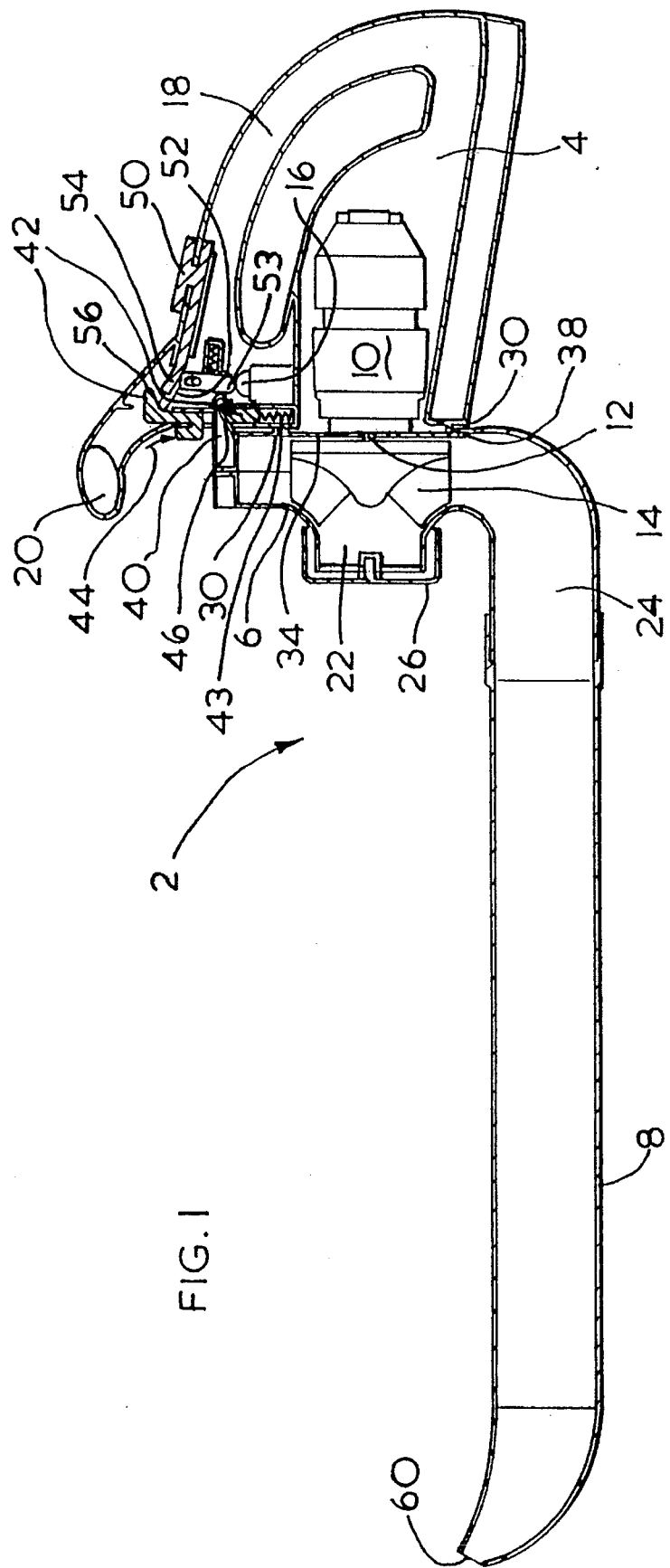
FIG. 1 shows a cross section of a blower vacuum in blower mode which comprises a safety interlock according to the present invention.

Referring to FIG. 1, the blower vacuum has a motor 10 located within a housing 4. The housing 4 comprises a rear handle 18 and a front handle 20 by which the device is carried by an operator. When activated by depression of the switch 16, the motor 10 rotatably drives a fan 14 via a drive shaft 12. A blowing involute 6 which is releasably attachable to the housing 4 fits over the fan 14. The involute 6 has an inlet 22 which is located in front of the fan 14 and is permanently covered by a grill 26. The involute 6 also has an outlet 24 located radially of the fan 14 to which a blower duct 8 is attached. The blower duct 8 has a nozzle 60 at its end distant from the outlet 24. When the motor 10 is activated, the fan 14 rotates and draws air through the drill 26 and expels air out of the outlet 24. The air expelled from the outlet 24 travels down the blower duct 8 and is expelled from the nozzle 60. The nozzle 60 is directed towards the ground by an operator of the blower vacuum to direct debris from one place to another.

Figure 2:
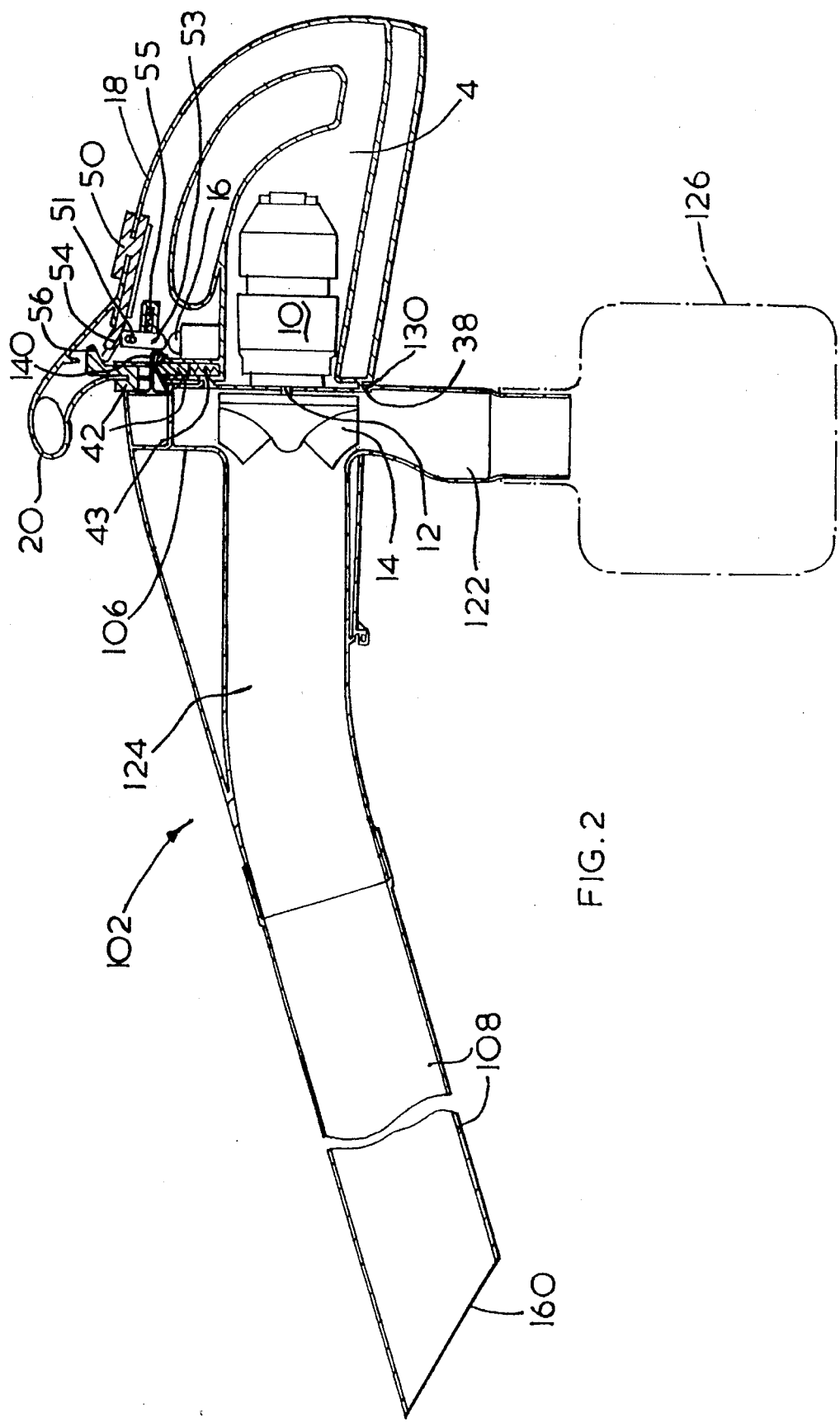
FIG. 2 shows a cross section of the blower vacuum of FIG. 1 in vacuum mode.

FIG. 2 shows the blower vacuum of FIG. 1 in its vacuum mode. In the vacuum mode the blowing involute 6 is replaced by a vacuum involute 106. Using different involutes for different modes of operation means that the air flow characteristics of the blower vacuum can be optimized for each mode. In blowing mode a high blowing air speed is required, whereas in vacuum mode air speed is not as critical but a large inlet 124 to the fan 14 is desirable to allow debris to travel through the fan without becoming caught in the fan.

The vacuum involute 106 has an air inlet 124 located in front of the fan 14 which forms the top half of the suction duct 108. It has an air outlet 122 located radially of the fan 14 which is covered by a collecting bag 126. When the motor 10 is activated, the impeller 14 rotates to draw air and entrained debris into the end 160 of the suction duct 108, along the suction duct 108 and through the fan 14. The air and debris is expelled radially of the fan 14 into the outlet 122 and the porous collecting bag 126.

The safety interlock used on the blower vacuum of FIGS. 1 and 2 will now be described.

The involutes 6, 106 have a lower rim 30, 130 which locates within a longitudinal slot 38 in the housing 4. The involutes 6, 106 also have a catch 40, 140 which locates within a latch 42. The latch 42 is biased by a spring 43 into the position shown in FIGS. 1 and 2, in which the latch is urged upwards to secure the catch 40, 140 and thus the involute 6, 106 to the housing 4.

In order to attach an involute 6, 106 to the housing 4, the latch 42 is depressed by an operator against the action of the spring 43 as shown by arrow 44 in FIG. 1. The rim 30, 130 of the volute 6, 106 is located within the corresponding slot 38 in the housing 4. The catch 40, 140 is then urged towards the housing 4 until it reaches the position shown in FIGS. 1 and 2. The latch 42 is then released and the spring 43 urges it upwards to secure the catch 40, 140 and thus the involute 6, 106 to the housing 4.

In order to activate the motor 10 the switch 16 must be depressed. The switch 16 is depressed by moving the actuating member 50 forward. The actuating member 50 when in its forward position (not shown) depresses a pivot lever 53 which bears against the end of the catch 40, 140 and depresses the switch 16. The actuating member 50 is slidably mounted on the rearward handle 18 in a position where it can be moved forwards and backwards by an operator of the blower vacuum. The pivot lever 53 is pivotably mounted within the housing 4 on a pin 51. A spring 55 biases the pivot lever 53 towards the front face of the housing 4, i.e. towards the left-hand side of the Figure, so that the pivot lever 53 will depress the switch 16 only when the catch 40, 140 urges the pivot lever 53 against the action of the spring 55 into the vertical position as shown in FIGS. 1 and 2. Thus, only when the involute 6, 106 is attached to the housing 4 (i.e. only when the catch 40, 140 urges the pivot lever 53 as shown) can the switch 16 be depressed and the motor 10 be activated. When the involute 6, 106, is detached from the housing 4, i.e. when the fan 14 is exposed moving the actuating member 50 forwards will not activate the motor 10 and so the blower vacuum cannot be operated when the impeller 14 is exposed. With the catch 40, 140 removed, the pivot lever 53 is urged by spring 55 away from the switch 16 into the gap left by removal of the catch 40, 140.

Figure 3:
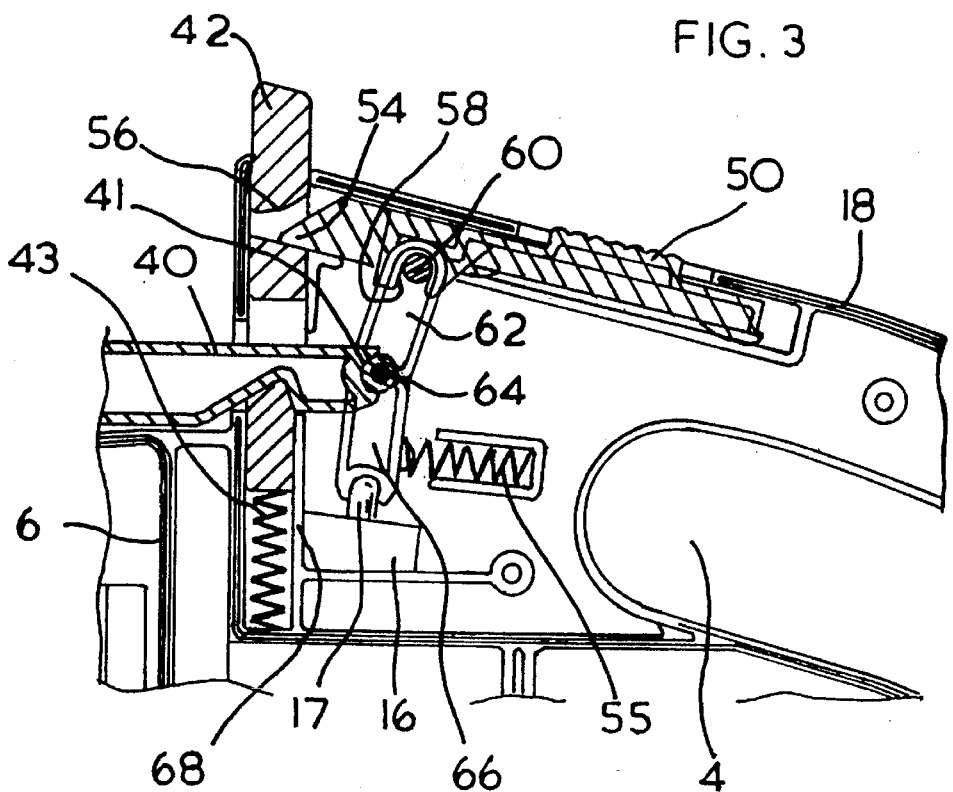
FIG. 3 shows a cross section of a blower vacuum such as that shown in FIGS. 1 and 2 having a second design of safety interlock.

A lock 54 located at the end of the actuating member 50 is urged under a lip 56 of the latch 42 so that the latch cannot be depressed when the actuating member 50 is in its forward position in which the motor is actuated. The motor has to be deactivated by moving the actuating member 50 to its rearward position as shown in FIGS. 1 and 2 before the latch 42 can be depressed to remove the volute. Referring now to FIG. 3, the safety interlock shown therein is similar to that described above in relation to FIGS. 1 and 2. To attach the involute 6, 106 to the housing 4 the latch 42 is depressed and the catch 40, 140 is inserted within the latch 42. Then the latch 42 is released and spring 43 urges it. upwards to secure the catch 40, 140 within the housing 4.

The safety interlock comprises the actuating member 50 which is slidably located in the rearward handle 18 of the blower vacuum. The member 50 can be moved between a forward "on" position and a rearward "off" position. The actuating member 50 has a recess 58 within which is secured a first pin 60. An upper pivot lever 62 is pivotably secured to a second pivot lever 66 by a second pin 64. The second pivot lever 66 is pivotably secured at its lower end to a plunger 17 of the switch 16. The lower pivot lever 66 is biased by a spring 55 towards the housing wall 68. The catch 40 has a recess 41 at its end which is engageable with the second pin 64 to urge the lower pivot lever 66 against the action of the spring 55.

When the involute 6, 106 is attached to the housing 4 and the actuating member 50 is moved forward to its "on" position, the recess 58 in the actuating member 50 pushes to pin 60 forwards to move the upper pivot lever 62 into a more vertical position. The recess 41 in the catch 40, 140 bears against the second pin 64 and the second lever 66 is pushed downwards to depress the plunger 17 of the switch 16 and the motor is actuated.

When the involute is removed from the housing, pushing the actuating member 50 into its forward position does not actuate the switch 16 because the second pin 64 is not supported by the catch 40, 140 and so the lever 66 is not urged downwards. Instead the spring 55 urges the bottom of the lever 62, the top of the lever 66 and the pin 64 into the gap left by the removal of the catch 40, 140.

Similarly to the devices described in relation to FIGS. 1 and 2, the involute 6, 106 cannot be removed from the housing 4 when the motor is actuated because the lock 54 is held underneath the lip 56 of the latch 42. Thus, the latch 42 cannot be depressed to remove the involute 6, 106.

Figure 4:
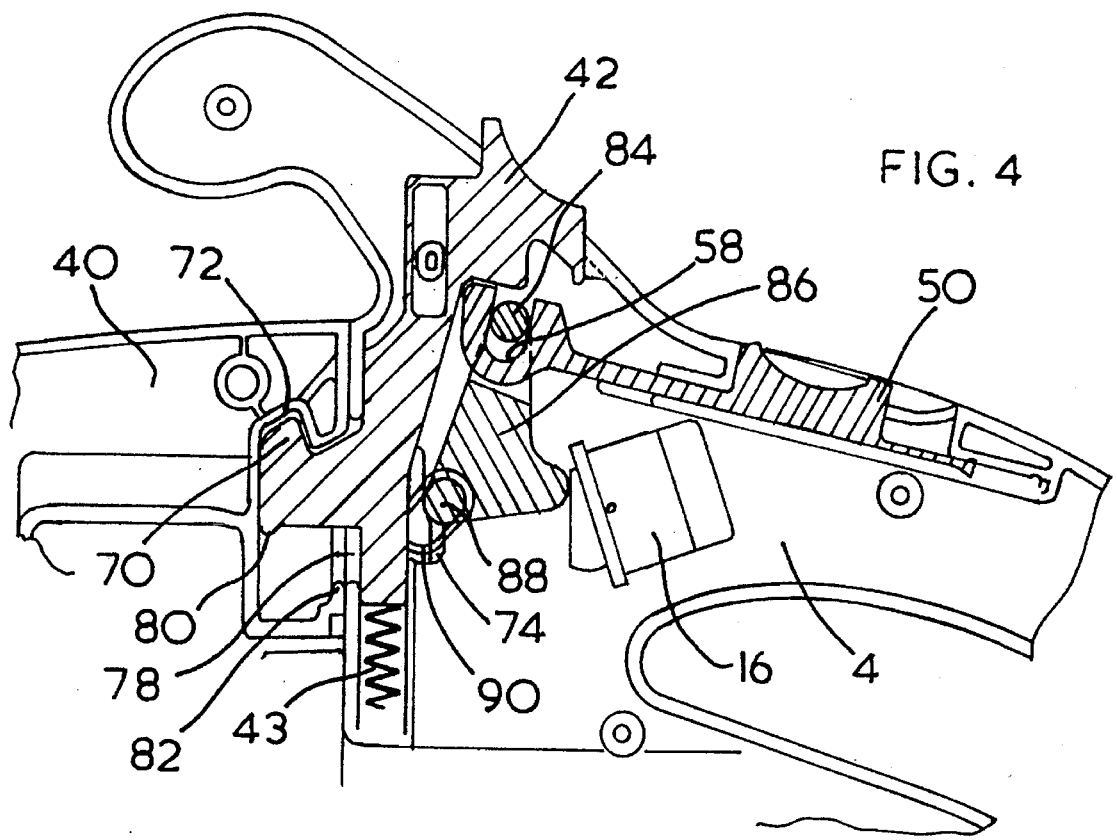
FIG. 4 shows a cross section of a blower vacuum such as that shown in FIGS. 1 and 2 having a third design of safety interlock.
Figure 5:
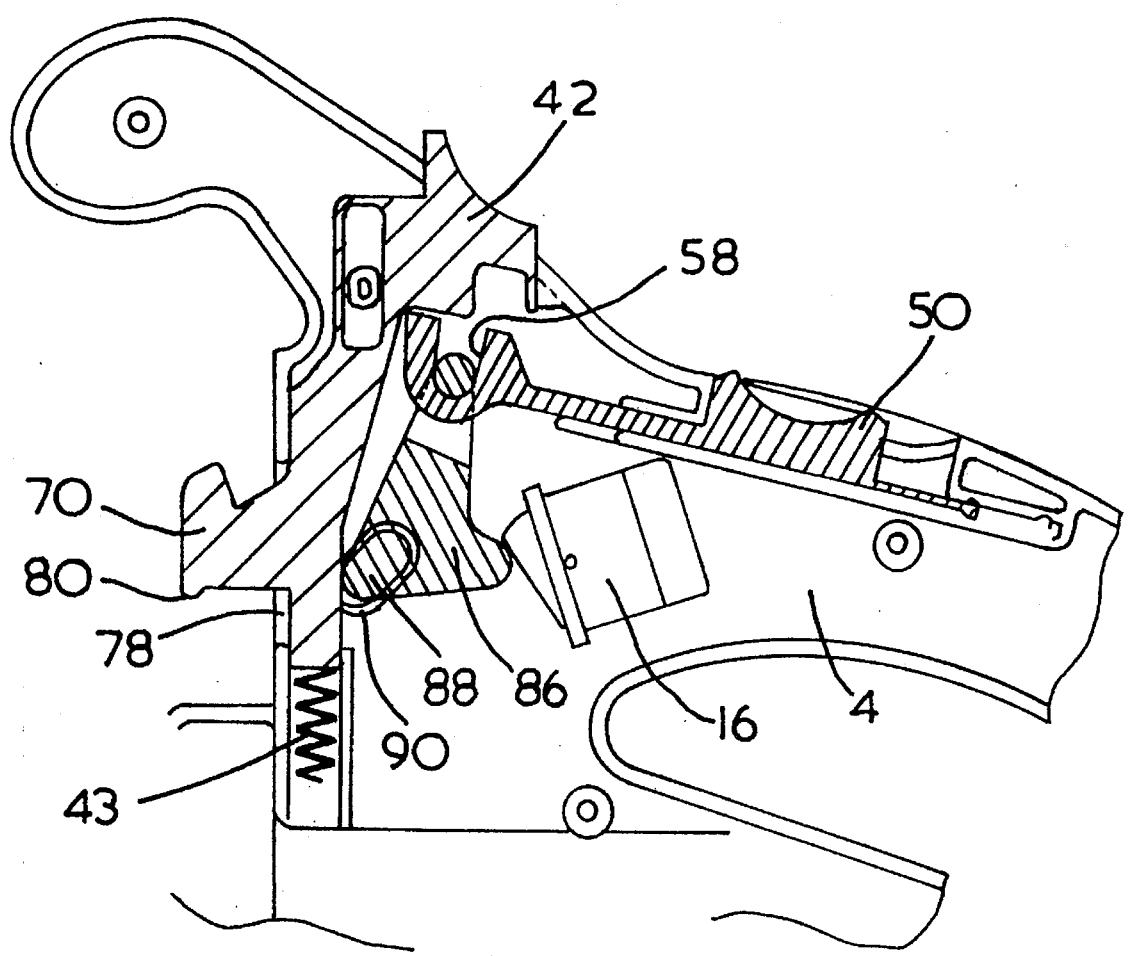
FIG. 5 shows a cross section of the safety interlock shown in FIG. 4 with the involute removed.

The main difference between the safety interlock shown in FIGS. 1 to 3 and that shown in FIGS. 4 and 5 is that in FIGS. 4 and 5 the latch 42 has a hook 70 which engages with a recess 72 in the catch 40, 140. The advantage of having the hook 70 on the latch 42 is that the latch is a small component and so can cheaply be made of a strong material. The catch 40, 140 in the embodiments shown in FIGS. 1 to 3 forms part of a large component, the involute 6, 106 and so is expensive to make out of a high strength material.

Referring now to FIG. 4, the involute 6, 106 is secured to the housing 4 by depressing the latch 42 against the action of a spring 43. When the latch is depressed, the recess 72 in the catch 40 can be fitted over the hook 70 and two projections 74 which form part of the catch 40, 140 can be inserted into the housing 4 through the aperture 78 with one projection 74 at either side of the latch 42. The latch 42 is then released and the spring 43 urges the latch upwards so that the catch 40 is held securely to the housing 4 by the hook 70 and projections 74.

To release the involute 6, 106 from the housing 4, the latch 42 is depressed. The lip 80 on the hook 70 engages with the bottom rim 82 of the recess 72 in the catch 40 so that the involute does not fall off the housing 4, but has to be lifted off by an operator of the blower vacuum. This makes it less likely for the involutes 6, 106 to be dropped and damages when they are interchanged.

The actuating member 50 comprises a recess 58 at its forward end which pivotally carries a first pin 84 which is attached to an L-shaped pivot lever 86. A second pin 88 is attached to the junction of the L-shaped pivot lever 86 and is pivotally and slidably mounted in a slot 90 in the housing 4.

When the involute 6, 106 is attached to the housing 4, the projections 74 urge the second pin 88 along the slot 90 into the position shown in FIG. 4. When the second pin 88 is in this position, movement of the actuating member 50 to the forward position (as shown in FIG. 4) causes the recess 58 to move the pin 84 forward and pivot the L-shaped pivot lever 86 so that it depresses the switch 16 to activate the motor.

When the involute is detached from the housing 4 (FIG. 5), the pin 88 is urged into the position shown in FIG. 5 by the switch 16 which is biased to its off position. Thus, movement of the actuating member 50 to the forward position cannot actuate the switch 16.

Also, when the actuating member 50 is in its forward position as shown in FIGS. 4 and 5, the catch 42 cannot be depressed and so the involute cannot be removed when the motor is running.

A further advantage is that if the hook 70 breaks, the involute 6, 106 will fall away from the housing 4 and with it the projections 74. Thus, the motor will be deactivated should the attachment between the involute 6, 106 and the housing 4 break at its weakest point. This provides a further safety advantage. If the actuating means, i.e. the pivot lever 58 is responsive to an extension 74 of the involute 6, 106 which does not bear the main weight or stresses of the releasable attachment between the attachment member and the housing then should the attachment fail in its weakest place, the motor will be deactivated.

We claim:

1. A blower vacuum comprising:

a motor (10) operated by a switch (16) and located in a housing (4), a fan (14) drivable by a motor, at least one attachment member (6, 106) which covers the fan and which is releasably attachable to the housing, and a safety interlock located at the interface between the housing and the attachment member comprising;

actuating means responsive to the attachment member for activating the switch only when the attachment member is attached to the housing, characterised in that the safety interlock additionally comprises;

a locking means (54) for locking the attachment member to the housing when the motor is switched on.

2. A blower vacuum according to claim 1 characterised in that the attachment member is releasably attached to the housing by a catch means (40, 140) which is selectively engagable by a latch means (42).

3. A blower vacuum according to claim 2 characterised in that the locking means (54) locks the latch means (42) in a position in which it engages the catch means (40,140).

4. A blower vacuum according to claim 2 characterised in that the latch means comprises a hook (70) which engages with a recess (72) in the catch means.

5. A blower vacuum according to claim 4 wherein the catch means is located on the attachment member and additionally comprises at least one projection (74) and the actuating means is responsive to the projection/s to actuate the motor.

6. A blower vacuum according to claim 1 characterised in that the locking means is responsive to an actuating member (50) on the housing which is operable by a user of the blower vacuum.

7. A blower vacuum according to claim 6 characterised in that the actuating means is responsive to the actuating member (50) to activate the switch (16).

8. A blower vacuum according to claim 1 characterised in that the actuating means is responsive to an extension (40, 74) of the attachment member (6, 106) to activate the switch.

9. A blower vacuum according to claim 1 claims wherein the actuating means comprises at least one pivot lever (53, 62,66, 86) which activates the switch (16) when an actuating member (50) operated by the user of the blower vacuum and an extension (74, 40) of the attachment member both engage the actuating means.

10. A blower vacuum according to claim 1 characterised in that the attachment member is a blower involute (6) when the blower vacuum is in blower mode and a vacuum involute (106) when the blower vacuum is in suction mode.

11. A blower vacuum according to claim 1 characterised in that the attachment member is a grill when the blower vacuum is in blower mode and a suction duct when the blower vacuum is in vacuum mode.

12. A blower vacuum according to claim 1 characterised in that the actuating means is responsive to an extension (74) of the attachment member (6, 106) which extension does not bear the main weight or stresses of the releasable attachment between the attachment member and the housing.

* * * * *